(12) United States Patent
Yoshida et al.

(10) Patent No.: US 6,246,217 B1
(45) Date of Patent: Jun. 12, 2001

(54) NON-AQUEOUS ELECTROLYTIC BATTERY MODULE FOR ARTIFICIAL SATELLITE

(75) Inventors: Hiroaki Yoshida; Takefumi Inoue; Naozumi Miyanaga; Nobutaka Imamura, all of Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 0 days.

(21) Appl. No.: 09/664,067

(22) Filed: Sep. 18, 2000

(30) Foreign Application Priority Data

Sep. 17, 1999 (JP) .................................................. 11-264413

(51) Int. Cl.⁷ .................................................. H01M 10/46
(52) U.S. Cl. .............................................................. 320/150
(58) Field of Search ..................................... 320/101, 125, 320/127, 128, 130, 137, 150, 153; 729/61, 90

(56) References Cited

U.S. PATENT DOCUMENTS 5,939,864 * 8/1999 Lenhart et al. .
6,027,076 * 2/2000 Krause .

* cited by examiner

Primary Examiner—Edward H. Tso
(74) Attorney, Agent, or Firm—Sughrue, Mion, Zinn, Macpeak & Seas, PLLC

(57) ABSTRACT

An artificial satellite is equipped with solar batteries and a non-aqueous electrolyte battery module for artificial satellite (i.e., a lithium battery). The non-aqueous electrolyte battery module is provided with a non-aqueous electrolyte battery, a temperature sensor, a charged state measurement sensor, and a computer for receiving signals output from the sensors. The managed temperature of the non-aqueous electrolyte battery in a solstice season is set so as to become equal to or lower than the managed temperature of the battery when the satellite is in the solstice season. The computer controls a temperature controller, thereby maintain the managed temperature of the battery within a given temperature range. The charged state of the lithium battery is controlled by means of turning on or off a charging switch under the control of computer. When the satellite is in the eclipse season, the managed charged state of the non-electrolyte battery is controlled so as to be a value of 50% or more. When the satellite is in the solstice season, the managed charged state of the non-aqueous electrolyte battery is controlled so as to be a value of 75% or less.

8 Claims, 11 Drawing Sheets

NON-AQUEOUS ELECTROLYTIC BATTERY MODULE FOR ARTIFICIAL SATELLITE

BACKGROUND OF THE INVENTION

1. Field of the Invention

The present invention relates to a non-aqueous electrolytic battery module for use with an artificial satellite.

2. Description of the Related Art

An artificial satellite is usually equipped with a solar battery and a secondary battery. The solar battery supplies power to the artificial satellite during a solstice season (i.e., a period in which the solar battery is exposed to sunlight). During the solstice season, the secondary battery is charged by the solar battery. During an eclipse season (i.e., a period in which sunlight is blocked by the earth and the solar battery is not exposed to sunlight), the secondary battery supplies power to the artificial satellite.

A secondary battery provided in an artificial satellite is required to maintain stable charge/discharge cycles for over fifteen years. A nickel-hydrogen battery, for example, has conventionally been used as such a secondary battery. During a solstice season, i.e., a season during about 138 days in which the solar battery is always exposed to sunlight, the secondary battery is maintained in a fully charged state or a highly charged state by means of a float charging operation. During an eclipse season, i.e., a season during about 45 days in which the solar battery is eclipsed by the earth once a day, the secondary battery is discharged to supply power for the artificial satellite.

Recently, an attempt has been made to use a lithium battery including lithium-ion battery as a secondary battery to be provided in an artificial satellite. A lithium battery is deteriorated faster than is a nickel-hydrogen battery, when the batteries are maintained at high temperature. Further, the lithium battery is deteriorated much more than the nickel-hydrogen battery, when the batteries are maintained at a highly charged state. For these reasons, in a case where a lithium battery is maintained in the same managed temperature state or manage charged state as that in which a conventional nickel-hydrogen battery is maintained, the lithium battery is deteriorated faster than is the nickel-hydrogen battery. As a result, the discharging capacity of the lithium battery is diminished, and hence the lithium battery encounters difficulty in maintaining a stable charge/discharge characteristic.

SUMMARY OF THE INVENTION

It is an object of the present invention to provide a non-aqueous electrolyte battery for an artificial satellite which can exhibit a stable charge/discharge characteristic over a long period of time.

According to a first aspect of the present invention, a non-aqueous electrolyte battery module comprises: a non-aqueous electrolyte battery to be provided in an artificial satellite; temperature measuring means for measuring the temperature of the non-aqueous electrolyte battery; heating/cooling means for heating or cooling the non-aqueous electrolyte battery; and battery temperature control means for controlling the heating/cooling means on the basis of the temperature measured by the temperature measuring means; wherein when the satellite is in a solstice season, a managed temperature of the non-aqueous electrolyte battery is controlled to be equal to or lower than a managed temperature of the non-aqueous electrolyte battery achieved when the satellite is in an eclipse season. That is, when the satellite is in the eclipse season, the managed temperature of the non-aqueous electrolyte battery is higher than the managed temperature of the non-aqueous electrolyte battery which is in the solstice season. Since the solstice season (about 138 days) is considerably longer than the eclipse season, the time during which the battery is maintained at a high temperature can be significantly shortened, thus preventing deterioration of the battery.

According to a second aspect of the present invention, in the first aspect, it is preferable that the managed temperature of the non-aqueous electrolyte battery is set to 10° C. to 35° C. when the satellite is in a eclipse season, and the managed temperature of the non-aqueous electrolyte battery is set to −30° C. to 10° C. when the satellite is in a solstice season.

According to the present invention, the battery is set so as to achieve the managed temperature set for the eclipse season or the managed temperature set for the solstice season, as soon as possible. The temperature of the battery is controlled so as to fall within the managed temperature ranges. At the time of transition from the eclipse season to the solstice season or vice versa, a lag naturally can arise in the change of temperature of an actual battery. Even in a case where the temperature of the battery temporarily exceeds the managed temperature range as a result of a rapid discharge operation, it goes without saying that such a case falls within the scope of the invention.

According to a third aspect of the present invention, in the first or second aspect, it is preferable that the non-aqueous electrolyte battery further comprises: charge/discharge condition detecting means for detecting the charge/discharged state of the non-aqueous electrolyte battery; charging/discharging means for charging and discharging the non-aqueous electrolyte battery; and charging/discharging control means for controlling the charging/discharging means on the basis of the charge/discharged state of the non-aqueous electrolyte battery detected by the charge/discharge condition detecting means; wherein when the satellite is located at the start of the eclipse season, a managed charged state of the non-aqueous electrolyte battery is controlled so as to be set a value of 50% or more, and when the satellite is in the solstice season, the charging/discharging control means controls the managed charged state of the non-aqueous electrolyte battery so as to be set a value of 75% or less. As a result, the power supply capability of the battery is ensured during the shadow period, and there can be prevented deterioration of the battery, which would otherwise be caused when the battery is placed in a highly-charged state for a long period of time during the solstice season.

According to a fourth aspect of the present invention, in the third aspect, it is preferable that when the satellite is in a solstice season, the managed charged state of the non-aqueous electrolyte battery is controlled so as to be a value of 75% or less by means of intermittent charging/discharging operations.

According to the present invention, the battery is set so as to achieve the managed temperature set for the eclipse season or the temperature set for the solstice season, as soon as possible. The temperature of the battery is controlled so as to fall within the managed temperature ranges. At the time of transition from the eclipse season to the solstice season or vice versa, a lag naturally can arise in the change of temperature of an actual battery. Even in a case where the managed charged state temporarily exceeds the charged state of the battery for any reason, it goes without saying that such a case falls within the scope of the invention.

When an artificial satellite is in a shadow period, a non-aqueous electrolyte battery provided in the satellite is set so as to supply power to equipment provided in the satellite. Therefore, there is a necessity for avoiding an increase in the internal resistance of the battery at a low temperature and to avoid an increase in self-discharge rate at a high temperature. During the solstice season, the battery is held at a lower temperature in order to prevent deterioration of the battery, which would otherwise be caused at high temperature. Further, during the eclipse season, freezing of the non-aqueous electrolyte battery must be prevented. To these ends, in the first aspect of the present invention, the managed temperature of the non-aqueous electrolyte battery during the eclipse season is set so as to become equal to or greater than that achieved during the solstice season. Consequently, when the satellite is in the solstice season, the managed temperature of the non-aqueous electrolyte battery is set so as to become equal to or lower than that achieved during the eclipse season. Thus, the battery can be operated over a long period of time.

According to the second aspect, during the eclipse season, the managed temperature of the battery is set so as to fall within the range of 10° C. to 35° C. Further, during the solstice season, the managed temperature of the battery is set so as to fall within the range of −30° C. to 10° C. The managed temperature range of the battery for the eclipse season is set to the range of 10° C. to 35° C., for the following reason. Specifically, when the temperature of the battery falls below 10°; for example, to 0° C., the impedance of the battery becomes high, thus being difficult to sufficiently supply power. In contrast, if the temperature of the battery exceeds 35° C.; for example, 45° C., the self-discharge rate of the battery becomes large, thus accelerating deterioration of the battery by high temperature. Thus, the life of the battery is shortened. In contrast, the temperature of the battery is set to fall within the range of −30° C. to 10° C. during the solstice season, for the following reasons. Specifically, if the temperature of the battery falls below −30° C.; for example, to −40° C., the electrolyte provided in the battery becomes frozen, so that it is hard to supply power in the event of emergency. In contrast, if the temperature of the battery exceeds 10° C.; for example 20° C., deterioration of the battery is accelerated, so that it is difficult to ensure the life of the battery over 15 years. The reason why a temperature of, for example, 20° C., is allowed as the managed temperature of the battery during the eclipse season, is that the eclipse season is considerably shorter than the solstice season. Therefore, an advantage of supply of sufficient power is given priority over the disadvantage due to deterioration of the battery. According to the present invention, during the eclipse season, the self-discharge rate and deterioration of a non-aqueous electrolyte battery (i.e., an increase in the internal resistance or a drop in the capacity of the battery) are inhibited during the eclipse season. During the solstice season, freezing of a non-aqueous electrolyte battery is avoided, and the battery can be maintained in a stable charged state over a long period of time.

When the non-aqueous electrolyte battery is held in a 100% charged state (fully-charged state) or a nearly-fully-charged state for a long period of time, the discharging capacity of the battery tends to decrease. For this reason, minimizing the time during which the battery is held in a highly charged state is important for maintaining the stable characteristic of the non-aqueous electrolyte battery. The managed maximum charged state of the non-aqueous electrolyte battery is set to a value of 50% or more during the eclipse season. The managed maximum charged state of the non-aqueous electrolyte battery is set to a value of 75% or less during the solstice season. Therefore, the time during which the non-aqueous electrolyte battery is held in a fully charged state can be shortened, thus ensuring the long life of the non-aqueous electrolyte battery.

Preferably, the actual maximum charged state of the non-aqueous electrolyte battery is set to a value of 75% to 100% during the eclipse season. More preferably, the actual charged state of the non-aqueous electrolyte battery is a value of 90% to 100% during the eclipse season. The actual maximum charged state of the non-aqueous electrolyte battery is a value of 10% to 60% during the solstice season, more preferably a value of 30% to 50%.

According to the fourth aspect, during the solstice season, the charge or trickle charge of the battery in a floating state, which has been used for a commonly known secondary battery, is stopped. The battery is charged intermittently and controlled so as to enter a managed charged state. Thus, the life of the non-aqueous electrolyte battery can be made much longer.

PREFERRED EMBODIMENTS OF THE INVENTION

Preferred embodiments of the present invention will be described in detail by reference to FIGS. 1 through 11.

Figure 1:
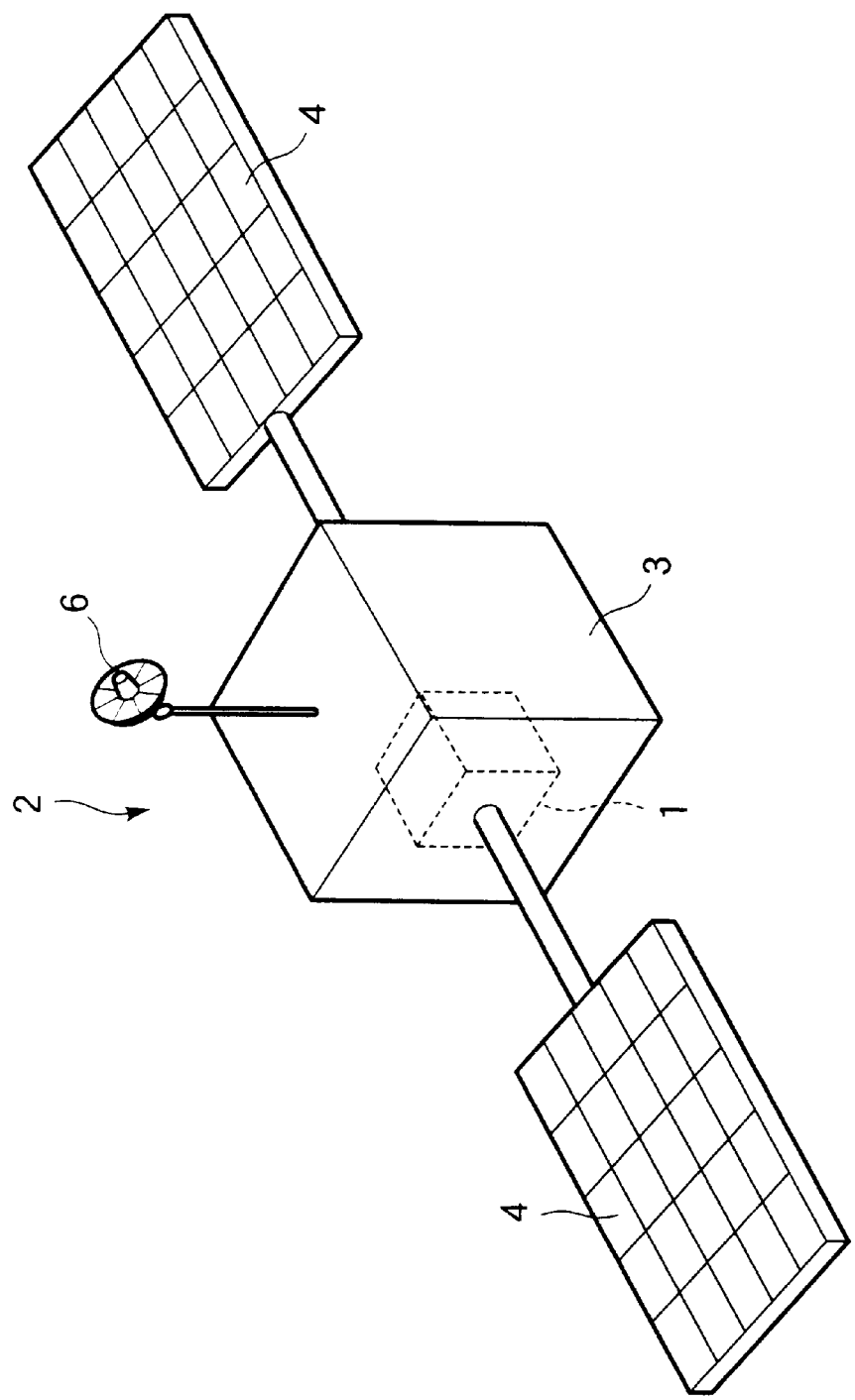
FIG. 1 is a perspective view showing an artificial satellite according to an embodiment of the present invention.

FIG. 1 shows an artificial satellite 2 equipped with a lithium battery module 1 for use with an artificial satellite (hereinafter called "lithium battery module") according to the present embodiment. A pair of solar batteries 4 are attached to respective sides of a main unit 3 of the artificial satellite 2 so as to be mutually opposed. The solar batteries 4 act as a power source of the artificial satellite 2 and are connected to a lithium battery 5 provided in the lithium battery module 1 so as to charge the lithium battery 5 (which will be described in detail later). The artificial satellite 2 has an antenna 6 for transmitting and receiving data to and from the earth E.

Figure 2:
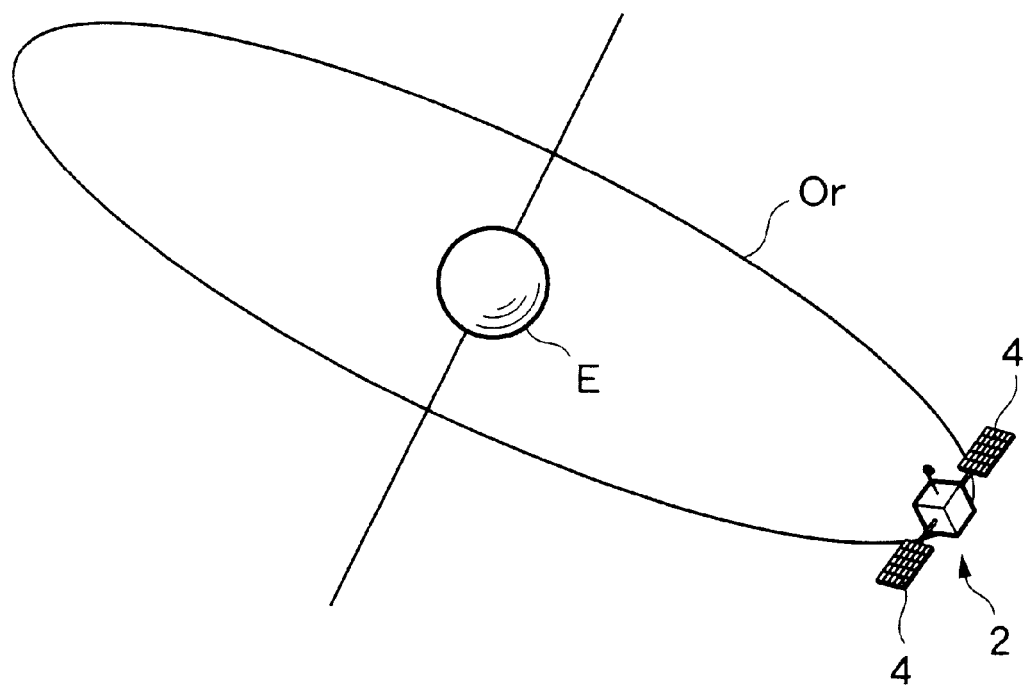
FIG. 2 is an illustration showing how the satellite is orbiting around the Earth.
Figure 3:
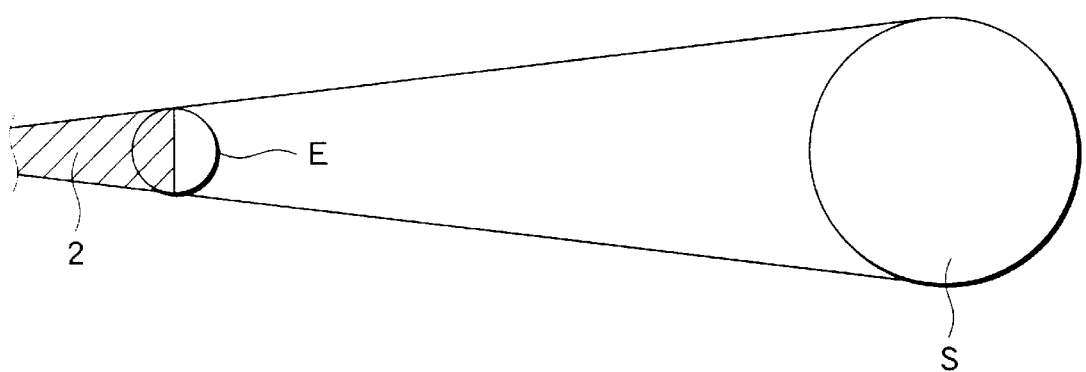
FIG. 3 is an illustration showing that the Earth casts a shadow on the satellite (i.e., the satellite is in an eclipse)

As shown in FIG. 2, the artificial satellite 2 orbits around the Earth E along a geostationary satellite orbit Or. When the Earth E is located in the vicinity of the vernal equinox or autumnal equinox in its orbit around the sun, the Earth E casts a shadow on the artificial satellite 2 for only a predetermined period of time. As shown in FIG. 3, the solar battery 4 enters an eclipse in which the solar batteries 4 cannot receive sunlight S (hereinafter, a period during which the solar batteries 4 are not exposed to sunlight will be called a "shadow period," and a period during which the solar batteries 4 are exposed to sunlight will be called a "sunshine period").

Figure 4:
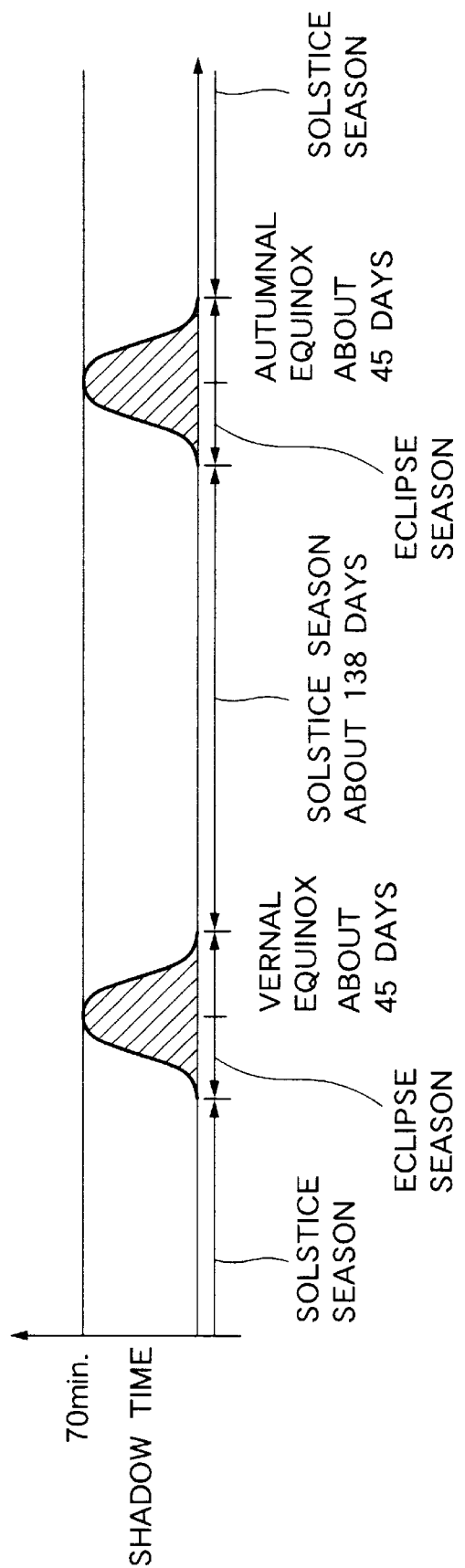
FIG. 4 is a graph showing variations in the sun-shadow time.

FIG. 4 is a graph showing variations in the shadow period (described as a "shadow time" in FIG. 4) in which the artificial satellite 2 enters within a year of the Earth E. When the Earth E approaches the vernal equinox or autumnal equinox, a shadow period arises. At the beginning, the duration of the shadow period is several minutes. However, the duration of the shadow period becomes longer and is a maximum value of about 70 minutes at the vernal and autumnal equinoxes. After lapse of the vernal or autumnal equinox, the duration of the shadow period becomes shorter in a pattern symmetric with that of the pre-equinox increase.

In the following description, a duration in which the artificial satellite 2 is in the shadow period at the time of vernal or autumnal equinox is called an eclipse season. When the artificial satellite 2 is in the eclipse season, each day the satellite 2 is in the shadow period for several minutes to tens of minutes and in the solstice season for the remaining twenty and some hours. If the Earth E is situated at a position other than the eclipse on the orbit of revolution, the artificial satellite 2 is always situated in the sunshine period (with the exception of a special situation in which the moon casts a shadow on the satellite 2). It is called a solstice season.

Figure 5:
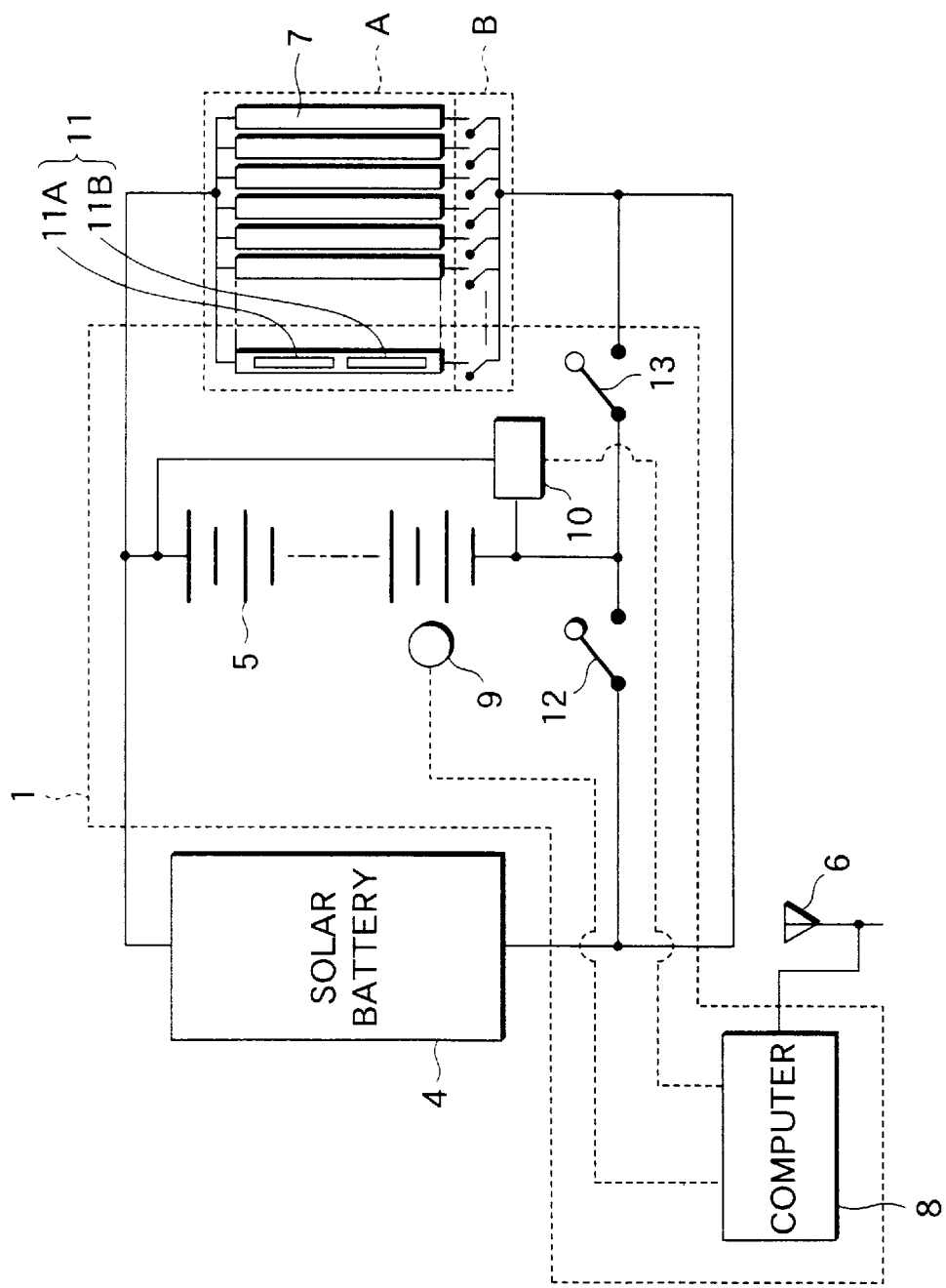
FIG. 5 is a block diagram schematically showing the electrical configuration of the satellite.

By reference to FIG. 5, the electrical configuration of the artificial satellite 2 will now be described. Incidentally, FIG. 5 schematically shows the electrical configuration of the artificial satellite 2 and dose not necessarily represent the electrical configuration correctly. The artificial satellite 2 is equipped with an electrical drive member A which is to be electrically driven, such as a fuel injection module 7 for changing an orbit and a computer 8 (although the computer 8 is also classified as the electrical drive member A, the computer 8 is omitted from the electrical diagram for the sake of convenience). The electrical drive member A is connected to the solar batteries A by way of a group of switches B. During a solstice season, electricity is supplied to the electric drive member A from the solar batteries A.

The configuration of the lithium battery module 1 according to the present embodiment will now be described. The lithium battery module 1 has the lithium battery 5; a temperature sensor 9 for measuring the temperature of the lithium battery 5; a charged state measurement sensor 10 for measuring the charged state of the lithium battery 5; the computer 8, which is connected to the temperature sensor 9 and the charged state measurement sensor 10 so as to receive signals output therefrom; a temperature controller 11 for controlling the temperature of the lithium battery 5; a charging switch 12 for charging the lithium battery 5; and a discharging switch 13 for connecting the lithium battery 5 to the electrical drive member A.

The lithium battery 5 is connected to the electrical drive member A by way of the discharging switch 13. When the artificial satellite 2 is in a sunshine period, the discharging switch 13 is usually in a disconnected state.

The temperature controller 11 has a heater 11A (corresponding to a "heating device") for heating the lithium battery 5, and a radiator 11B for dissipating heat from the lithium battery 5. The charged state measurement sensor 10 is arranged so as to measure the charged state of the lithium battery 5 on the basis of the voltage thereof.

Next will be described a flowchart for activating the lithium battery module 1 having the foregoing configuration.

<Temperature Control of a Lithium Battery>

By reference to FIGS. 6 and 7, there will be described a flowchart for controlling the temperature of the lithium battery 5. In the present embodiment, the temperature of the lithium battery 5 is controlled so as to fall within the range from −30° C. to 10° C. during the solstice season and fall within the range from 10° C. to 35° C. during the eclipse season.

Figure 6:
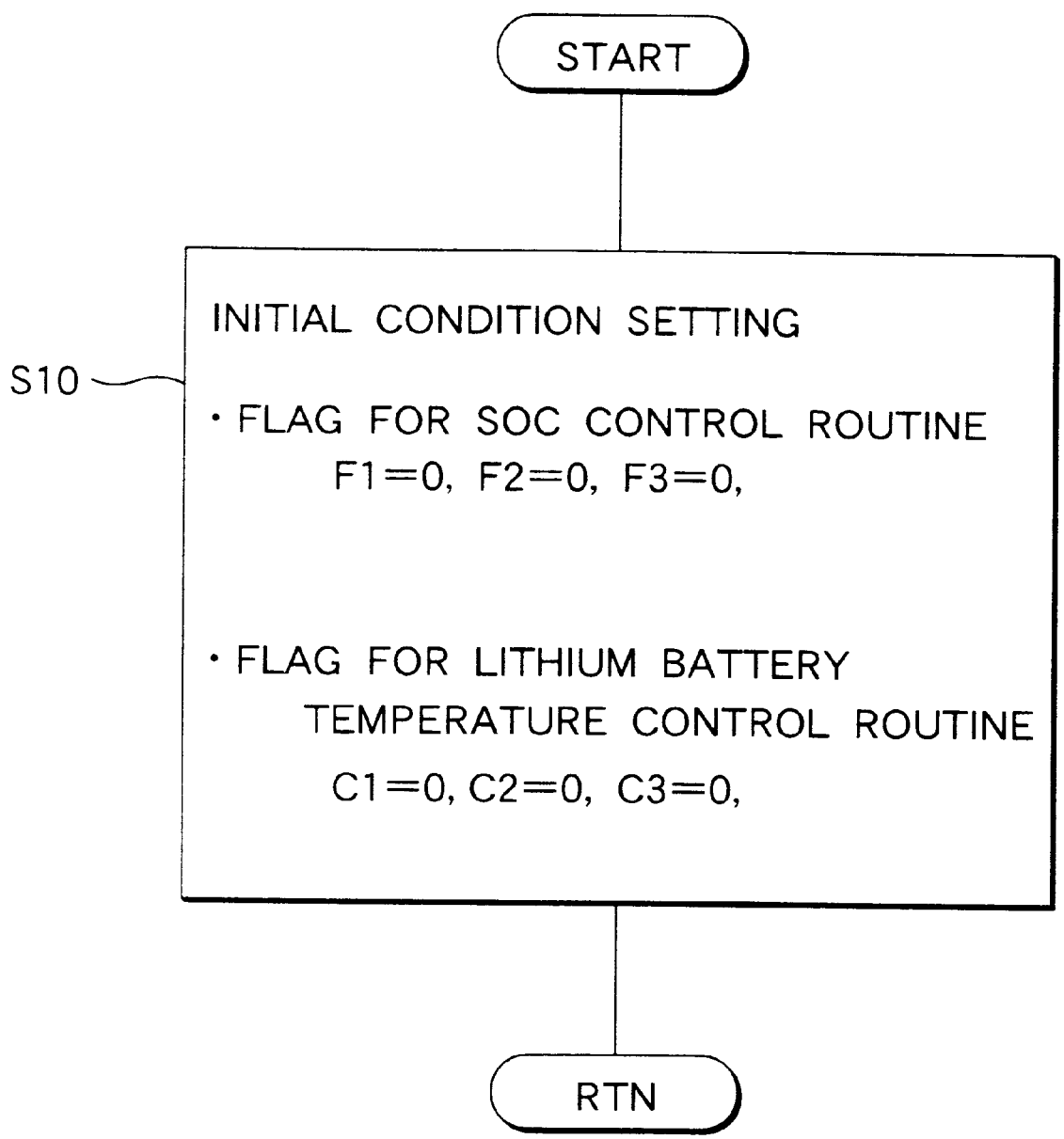
FIG. 6 is an initial condition setting routine used for controlling the temperature and charged state of a lithium battery.
Figure 7:
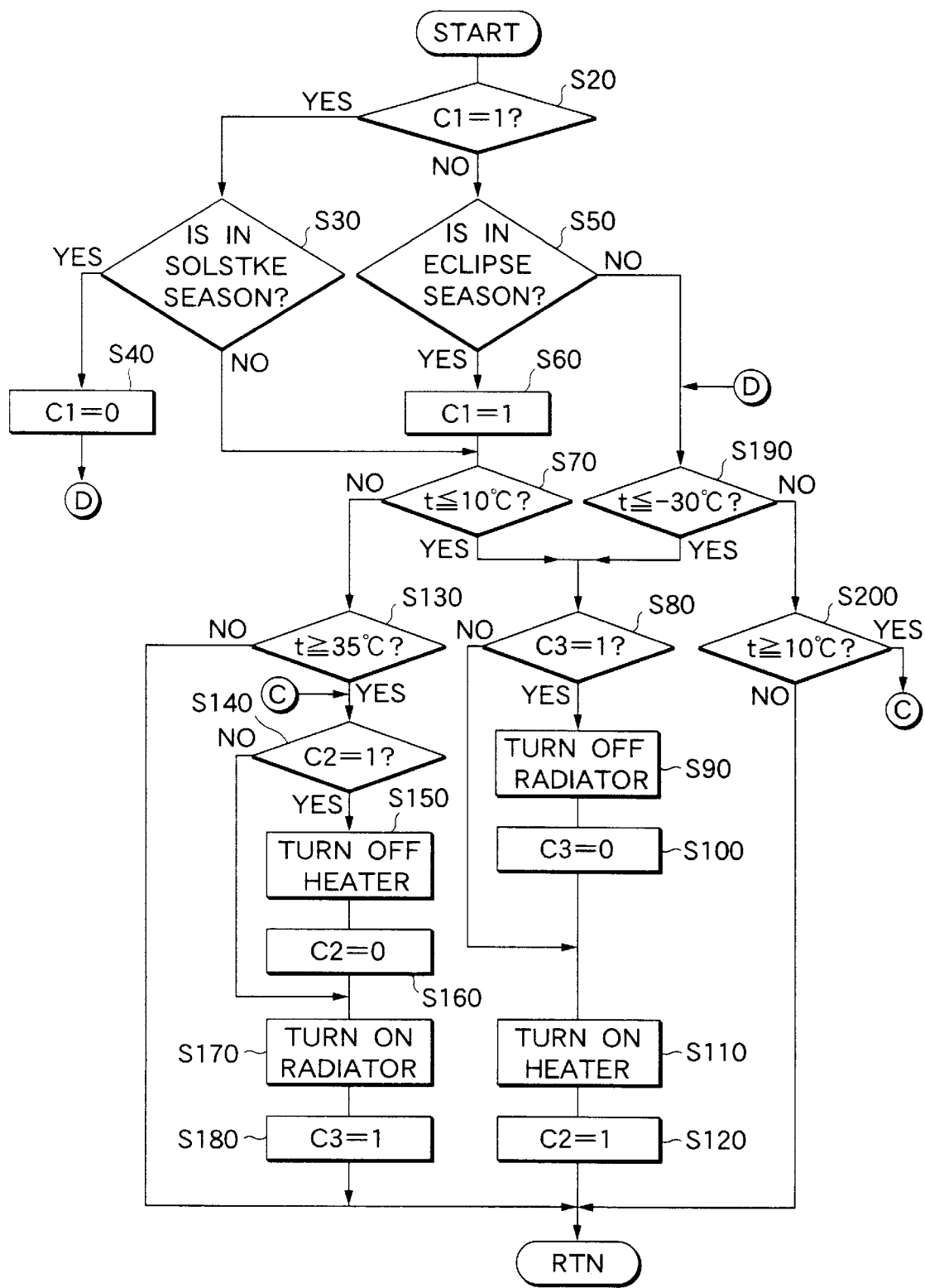
FIG. 7 is a flowchart showing processing procedures for controlling the temperature of the lithium battery.

As shown in FIG. 6, the computer 8 sets flags to their initial conditions (S10). Here, the computer 8 sets flags F1, F2, and F3 (which will be described in more detail by reference to the charged state control flowchart) controlling the charged state of the lithium battery 5 (hereinafter often referred to as "SOC"), and flags C1, C2, and C3 for controlling the temperature of the lithium battery 5, to initial values (all of which are zero).

Of the flags C1 to C3, the flag C1 designates the state of the artificial satellite 2. When the flag C1 is a value of 0, the satellite 2 is in a solstice season. In contrast, when the flag C1 is a value of 1, the satellite 2 is in an eclipse season. Further, the flag C2 designates the state of the heater 11A. When the flag C2 is a value of 0, the heater is in an inoperative state. In contrast, when the flag C2 is a value of 1, the heater is in an operating state. The flag C3 designates the state of the radiator 11B. When the flag C3 is a value of 0, the radiator 11B is in an inoperative state. In contrast, when the flag C3 is a value of 1, the radiator 11B is in an operating state.

A temperature control processing routine shown in FIG. 7 will now be described. The routine is invoked from a main routine (not shown) to be performed by the computer 8, at given time intervals.

The flag C1 is checked as to whether the satellite 2 is in the solstice season or the eclipse season (S20). In the present embodiment, when the solar batteries 4 are performing generating operations continuously for a day, the satellite 2 is determined to be in the solstice season. On the other hand, the solar batteries 4 are not performing generation operations, the satellite 2 is determined to be in the eclipse season.

<Procedures for Controlling the Temperature of the Lithium Battery During the Eclipse season>

In step 20, when flag C1 is a value of 1 (during the eclipse season), a determination is made as to whether or not the solstice season has started (S30). If NO is selected, temperature control operations for the eclipse season pertaining to step 70 and subsequent steps are performed. The following procedures are also performed even when flag C1 is a value of 0 in step 20, when in step 50 the eclipse season is determined to have started, and when in step 60 flag C1 is changed to a value of 1 (i.e., the satellite 2 is in a period of transition from the solstice season to the eclipse season).

In step 70, a determination is made as to whether or not the temperature "t" of the lithium battery 5 outputs from the temperature sensor 9 is lower than 10° C. If the temperature "t" is lower than 10° C., in step 80 the state of flag C3 is checked. In a case where flag C3 is a value of 1, the operation of the radiator 11B is terminated (S90). After flag C3 has been switched to a value of 0 (S100), processing proceeds to step 110. In a case where in step 80 flag C3 is a value of 0, processing proceeds to step 110, where the heater 11A is brought into an operating state. After flag C2 has been switched to a value of 1 (S120), processing returns to the main routine. In a case where the temperature "t" is lower than 10° C., the radiator 11B is brought into an inoperative state, and the heater 11A is brought into an operating state.

In step 70, in a case where the temperature "t" is higher than 10° C., in step 130 a determination is made as to whether or not the temperature "t" is higher than 35° C. In a case where the temperature "t" is lower than 35° C., processing returns to the main routine. In contrast, in a case where the temperature "t" is higher than 35° C., in step 140 a determination is made as to whether or not flag C2 is a value of 1. If flag C2 is a value of 1, the heater 11A is brought into an inoperative state (S150). After flag C2 has been switched to a value of 0 (S160), processing proceeds to step 170. If in step 140 flag C2 is determined to be a value of 0, the operation of the radiator 11 is started (S170). After flag C3 has been switched to a value of 1 (S180), processing returns to the main routine. In a case where the temperature "t" is higher than 35° C., the heater 11A is brought into an inoperative state, and the radiator 11B is brought into an operative state.

As mentioned above, during the eclipse season the temperature "t" of the lithium battery 5 is controlled so as to fall within the range of 10° C. to 35° C.

<Procedures for Controlling the Temperature of the Lithium Battery During the Solstice season>

In step 20, in a case where flag C1 is a value of 0 (during the solstice season), in step 50 temperature control operations for the solstice season pertaining to step 190 and subsequent steps are performed, given that the eclipse season has not yet started. The following processing operations are also performed even when in step 30 the solstice season is determined to have started and when in step 40 flag C1 is switched to a value of 0 (i.e., during a period of transition from the eclipse season to the solstice season).

In step 190, a determination is made as to whether or not the temperature "t" of the lithium battery 5 outputs from the temperature sensor 9 is lower than −30° C. In step 80 the state of flag C3 is checked. In a case where flag C3 is a value of 1, the operation of the radiator 11B is stopped (S90). After flag C3 has been switched to a value of 1 (S100), processing proceeds to step 110. In a case where flag C3 is a value of 0 in step 80, processing proceeds to step 110, where the heater 11A is brought into an operating state. After flag C2 has been switched to a value of 1 (S120), processing returns to the main routine. In a case where the temperature "t" is lower than −30° C., the radiator 11B is brought into an inoperative state, and the heater 11A is brought into an operative state.

In a case where in step 190 the temperature "t" is determined to be higher than −30° C., in step 200 a determination is made as to whether or not the temperature "t" is higher than 10° C. In a case where the temperature "t" is lower than 10° C., processing returns to the main routine. In a case where the temperature "t" is higher than 10° C., in step 140 a determination is made as to whether or not flag C2 is a value of 1. In a case where flag C2 is a value of 1, the operation of the heater 11A is stopped (S150). After flag C2 has been switched to a value of 0 (S160), processing proceeds to step 170. In a case where in step 140 flag C2 is a value of 0, the operation of the radiator 11B is started (S170). After flag C3 has been switched to a value of 1 (S180), processing returns to the main routine. In a case where the temperature "t" is higher than 10° C., the heater 11A is brought into an inoperative state, and the radiator 11B is brought into an operative state.

As mentioned above, during the solstice season the temperature "t" of the lithium battery 5 is controlled so as to fall within the range of −30° C. to 10° C.

<Procedures for controlling the charged state of the Lithium Battery>

Figure 8:
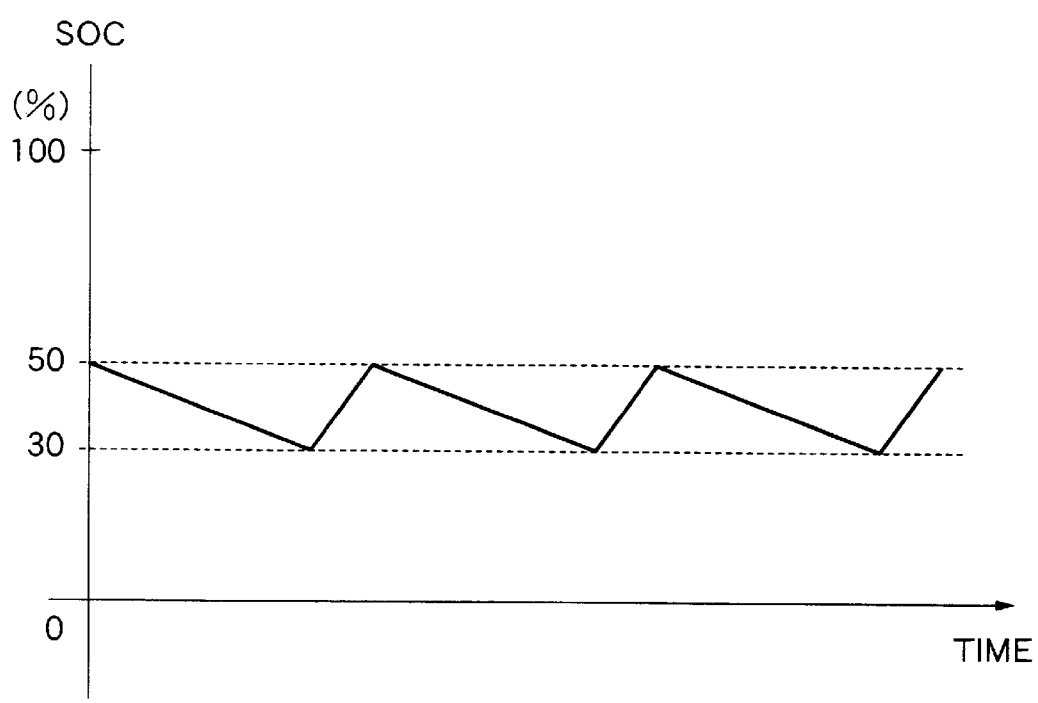
FIG. 8 is a graph showing a charged state of the lithium battery during a solstice season.

By reference to FIGS. 8 through 11, there will be described procedures for controlling the charged state of the lithium battery 5. FIG. 8 shows transition of the charged state of the lithium battery 5 in a case where the satellite is positioned other than the eclipse while the Earth E is on its orbit around the sun. In this position, only the solstice season is in principle continued. As will be described later, the lithium battery 5 is controlled so as to charge to a charged state of 50% or more. At this time, the lithium battery 5 is not in a floating state of charging or a trickle charging state, as is likely to be the case of a conventional secondary battery. When the charged state drops to 50%, the lithium battery 5 is intermittently charged to 100%.

Figure 9:
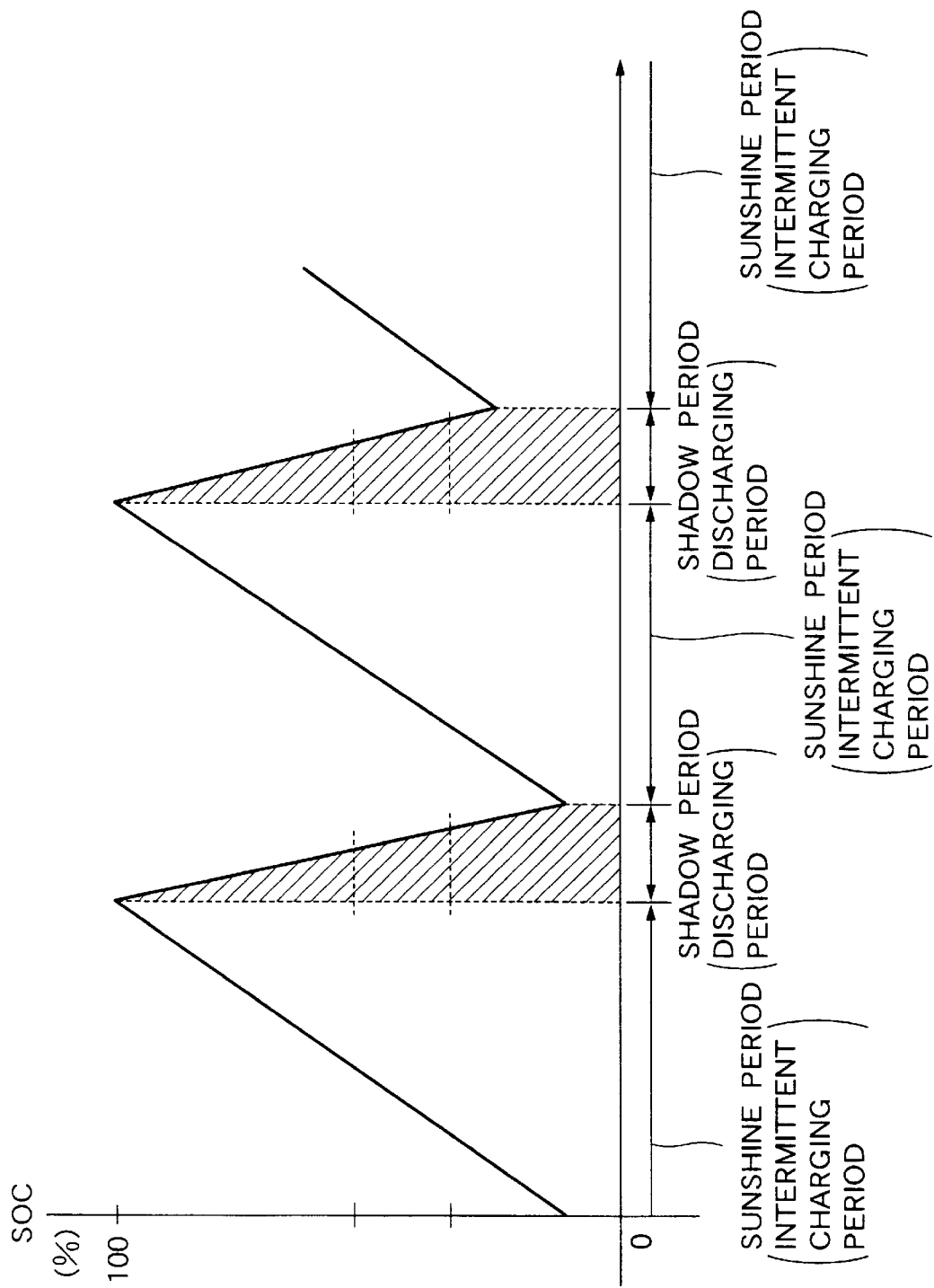
FIG. 9 is a graph showing a charged state of the lithium battery during the period of an eclipse season.

FIG. 9 shows transition in the charged state of the lithium battery 5 when the Earth E is in an eclipse. At this time, during a part of solstice season, the lithium battery 5 is intermittently charged so as to maintain 50% to 100%, as in the case where the satellite 2 is the solstice season (this period will be hereinafter referred to as an "intermittently charging/discharging period"). When the shadow period is started, the lithium battery 5 starts a discharge operation, thus supplying power to the satellite 2 (this period will be hereinafter referred to as a "discharging period"). After the solstice season has started, the lithium battery 5 has been charged to 50% or more, and again enters an intermittently-charging state.

By reference to FIGS. 6, 10, and 11, there will be described a flowchart for controlling the charged state of the lithium battery 5.

As shown in FIG. 6, the computer 8 sets flags to their initial conditions (S10). Here, there will be described flags F1, F2, and F3 (initial values of which assume "0") for controlling the charged state of the lithium battery 5 (hereinafter often called "SOC").

Of flags F1 through F3, flag F1 designates the state of the lithium battery 5. Flag F1 is any one of values "0," "1," and "2." When flag F1 is a value of "0," the lithium battery 5 is in an intermittently charging/discharging period. When flag F1 is a value of "1," the lithium battery 5 is in a charging period. When flag F1 is a value of "2," the lithium battery 5 is in a discharging period. Flag F2 designates the state of the charging switch 12. When flag F2 is a value of 0, the charging switch 12 is in a charging/discharging-terminated state. When flag F2 is a value of 1, the charging switch 12 is in a charging/discharging state. Flag F3 shows the state of the discharging switch 13. When flag F3 is a value of 0, the discharging switch 13 is in a disconnected state. When flag F3 is a value of 1, the discharging switch 13 is in a discharged state.

Next will be described the sate of charge control routine shown in FIGS. 10 and 11. The routine is invoked from the main routine (not shown) to be performed by the computer 8, at predetermined time intervals.

There is checked flag F1, which shows the nature of the state of the lithium battery 5 (S300).

When flag F1 is a value of 0, in step S310 a determination is made as to whether or not in a solstice season has been reached. In the present embodiment, the solstice season is determined in accordance with a pre-programmed flow chart (not shown). Alternatively, a charging start signal may be transmitted from ground control.

<Procedures for controlling the charged state of the Lithium Battery During the Intermittently-Charging Period>

In step 320, a determination is made as to whether or not flag F2 is a value of 1. In a case where flag F2 is a value of 1 (i.e., the lithium battery 5 is being charged), processing proceeds to step 360. In contrast, when flag F2 is a value of 0 (i.e., the lithium battery 5 is not being charged), in step 330 a determination is made as to whether or not SOC is a value of 30% or less. If SOC is determined to be a value of 30% or less, the charging switch 12 is brought into a connected state (S340). After flag F2 has been switched to a value of "1" (S350), processing proceeds to step 360. In a case where in step 330 SOC is determined to be a value of greater than 30%, in step 360 a determination is made as to whether or not SOC is a value of 50% or more.

If in step 360 SOC is determined to be lower than 50%, processing returns to the main routine. In contrast, in a case where SOC is determined to be greater than 50%, the charging switch 12 is brought into a cut-off state (S370). After flag f2 has been switched to a value of 0 (S380), processing returns to the main routine.

During the intermittently charging period, the lithium battery 5 is controlled such that SOC is a value of 30% to 50%, by means of an intermittent charging operation.

<Procedures for controlling the charged state of the Lithium Battery During the Eclipse Charging/discharging Period>

Figure 10:
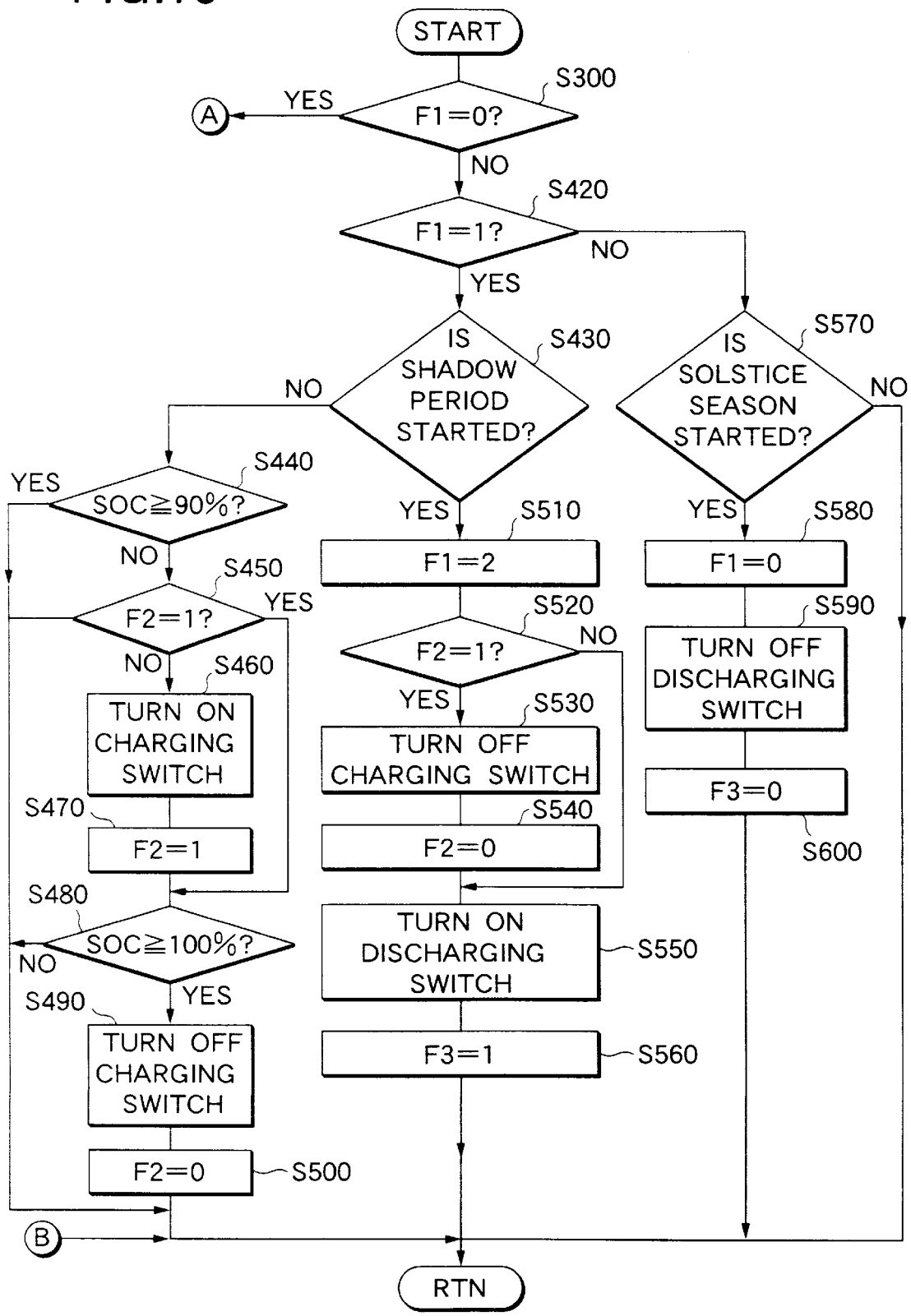
FIG. 10 is a flowchart (1) showing procedures for controlling the charged state of the lithium battery.
Figure 11:
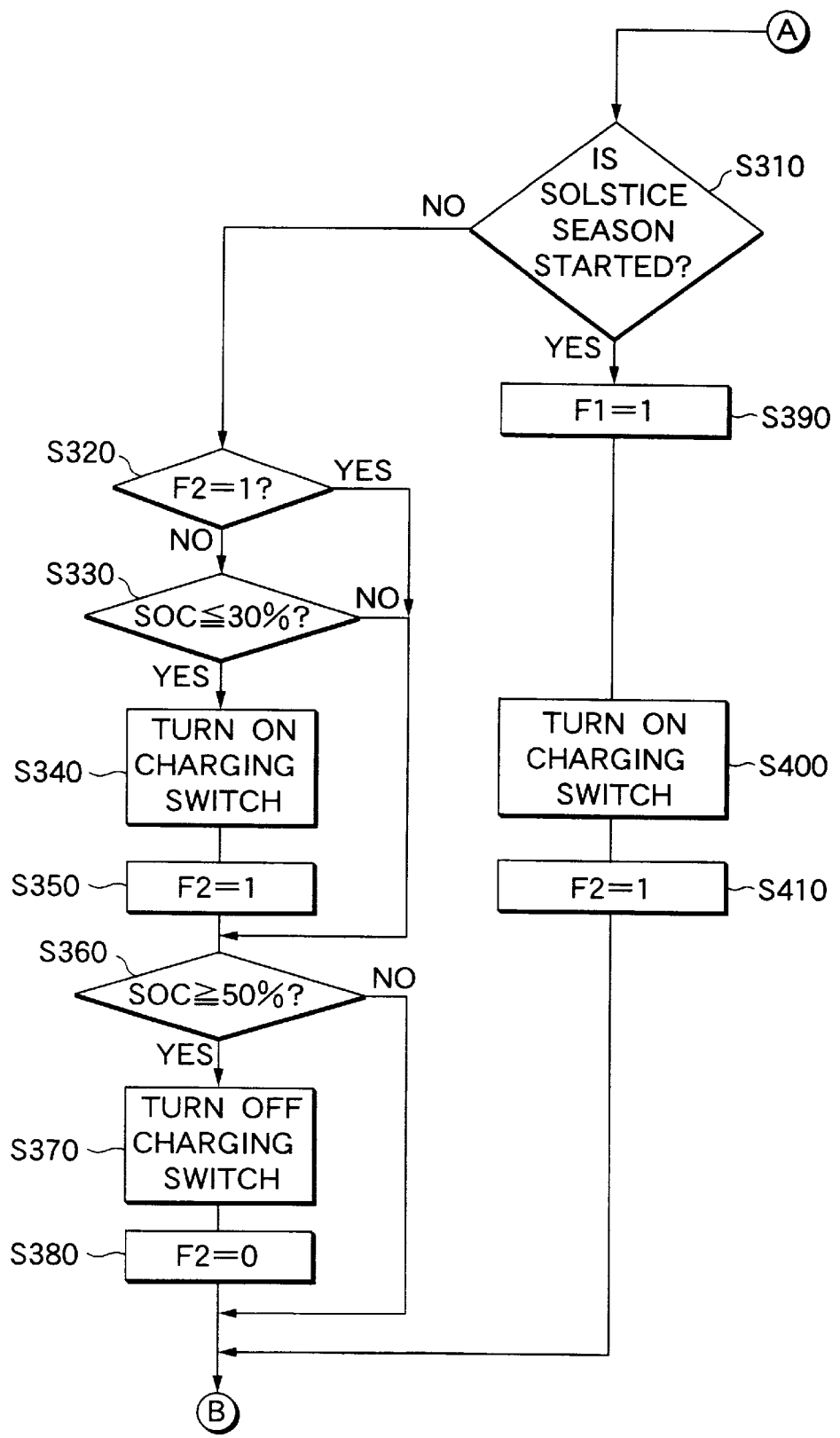
FIG. 11 is a flowchart (2) showing procedures for controlling the charged state of the lithium battery.

In a case where processing operations described in the flowchart shown in FIG. 10 have been performed, charging operations for the eclipse season pertaining to steps 440 to 500 are performed, provided that a discharging period (i.e., the eclipse season) has not yet started (S430).

In step 440 a determination is made as to whether or not SOC is a value of 90% or more. When YES is selected, processing returns to the main routine. In contrast, in a case where SOC is determined to be a value of lower than 90%, in step 450 a determination is made as to whether or not flag F2 is a value of 1 (a charged state). If YES is selected, processing proceeds to step 480. In a case where in step 450 flag F2 is a value of 0, the charging switch 12 is brought into a connected state (S460). After flag F2 has been switched to a value of 1 (S470), processing proceeds to step 480.

In step 480, a determination is made as to whether or not SOC is 100% or more. If NO is selected, processing returns to the main routine while the lithium battery 5 is held in a charging/discharging state. In contrast, if SOC has attained 100%, the charging switch 12 is brought into a cut-off state (S490). After flag F2 has been switched to a value of 0 (S500), processing returns to the main routine.

In this way, during the eclipse season, the lithium battery 5 is charged such that SOC is a value of 90% to 100%.

<Procedures for controlling the charged state of the Lithium Battery During the Charging/discharging Period>

Next will be described control procedures in a case where in step 430 the discharging period (i.e., the shadow period) is determined to have started. At this time, flag F1 is switched to a value of 2 (S510), and the state of flag F2 is determined (S520). In a case where flag F2 is a value of 0, processing proceeds to step 550. In a case where flag F2 is a value of 1 (i.e., the lithium battery 5 is being charged), the charging switch 12 is disconnected (S530). After flag F2 has been switched to a value of 0 (S540), processing proceeds to step 550.

In step 550, the discharging switch 13 is brought into a connected state. After flag F3 has been switched to a value of 1 (S560), processing returns to the main routine.

In a case where the routine shown in FIG. 10 is started during the discharging period (F1=2), processing proceeds from steps 300 and 420 to step 570. The discharging period is maintained until the solstice season (i.e., the intermittently charging/discharging period) is started. In a case where in step 570 the solstice season is determined to have started, flag F1 is switched to a value of 0 (S580), and the discharging switch 13 is disconnected (S590). After flag F3 has been switched to a value of 0 (S600), processing returns to the main routine.

During the discharging period, discharging of the lithium battery 5 is continued until the solstice season starts.

According to the present embodiment, the temperature "t" of the lithium battery 5 is controlled so as to be maintained in the range of 10° C. to 35° C. during the eclipse season. In contrast, the temperature "t" is controlled so as to be maintained in the range of −30° C. to 10° C. during the solstice season. As a result, during the eclipse season, the self-discharge or deterioration of the lithium battery 5 can be suppressed, whereby the lithium battery 5 can be maintained in a stably charged state over a long period of time.

At the time of start of the shadow period (i.e., a charging period), the SOC of the lithium battery 5 is a value of 90% to 100%. During the solstice season (i.e., an intermittently-charging state), the SOC of the lithium battery 5 is maintained so as to be a value of 30% to 50%. For this reason, the time during which the lithium battery 5 is maintained at a fully charged state can be shortened, thus ensuring long life of the lithium battery 5.

During the eclipse season, charging or trickle charging of the lithium battery 5 is stopped in a floating state which has been used for a commonly-known secondary battery, and the lithium battery 5 is charged intermittently, thus rendering the lift of the lithium battery 5 much longer.

In the present embodiment, the expression "100% charged state" signifies the charged state of the lithium battery 5 when the lithium battery 5 is subjected to constant-voltage/constant-current charging operations for eight hours using, for example, a charging current of 0.2 CA and a maximum allowable charging voltage of the lithium battery 5. In contrast, the expression "0% charged state" signifies the state of the lithium battery 5 when the amount of electric current corresponding to a nominal capacity of the lithium battery 5 has been discharged completely or discharged to a minimum allowable voltage.

The technical scope of the present invention is not limited to the previously described embodiment. For example, the following examples also fall within the scope of the present invention. Further, the scope of the present invention extends to the range of equivalence.

(1) In the present embodiment, the radiator 11B performs a control operation for a stationary or operating state. According to the present invention, in a case where heating means and cooling means are provided separately, the cooling means may be constantly connected to a non-aqueous electrolyte battery, and only the heating means performs control operations for stationary and operating states.

(2) In the present embodiment, the satellite 2 is orbiting along a geosynchronous satellite orbit. According to the present invention, the satellite may orbit along an orbit other than a geosynchronous satellite orbit.

What is claimed is:

1. A non-aqueous electrolyte battery module for an artificial satellite comprising:

a non-aqueous electrolyte battery to be provided in an artificial satellite;

temperature measuring means for measuring a temperature of said non-aqueous electrolyte battery;

heating/cooling means for heating or cooling said non-aqueous electrolyte battery; and battery temperature control means for controlling said heating/cooling means on the basis of the temperature measured by said temperature measuring means;

wherein when the satellite is in a solstice season, a managed temperature of said non-aqueous electrolyte battery is equal to or lower than a managed temperature of the non-aqueous electrolyte battery achieved when the satellite is in an eclipse season.

2. The non-aqueous electrolyte battery module for an artificial satellite as defined in claim 1;

wherein the managed temperature of said non-aqueous electrolyte battery is set to 10° C. to 35° C. when the satellite is in a eclipse season, and the managed temperature of the non-aqueous electrolyte battery is set to −30° C. to 10° C. when the satellite is in a solstice season.

3. The non-aqueous electrolyte battery for an artificial satellite as defined in claim 1, further comprising:

charge/discharge condition detecting means for detecting a charge/discharged state of said non-aqueous electrolyte battery;

charging/discharging means for charging/discharging said non-aqueous electrolyte battery; and charging/discharging control means for controlling said charging/discharging means on the basis of the charged state of said non-aqueous electrolyte battery detected by said charge/discharge condition detecting means;

wherein when the satellite is located in the eclipse season, the managed charged state of said non-aqueous electrolyte battery is controlled so as to be a value of 50% or more, and when the satellite is located in the solstice season, the managed charged state of said non-aqueous electrolyte battery is controlled so as to be a value of 75% or less.

4. The non-aqueous electrolyte battery for an artificial satellite as defined in claim 3;

wherein when the satellite is in a solstice season, the managed charged state of said non-aqueous electrolyte battery is controlled so as to be a value of 75% or less by means of intermittent charging/discharging operations.

5. The non-aqueous electrolyte battery for an artificial satellite as defined in claim 3;

wherein the charged state of said non-aqueous electrolyte battery is set to a value of 75% to 100% at the time of initiation of the eclipse season.

6. The non-aqueous electrolyte battery for an artificial satellite as defined in claim 5;

wherein the charged state of said non-aqueous electrolyte battery is set to a value of 90% to 100% at the time of initiation of the eclipse season.

7. The non-aqueous electrolyte battery for an artificial satellite as defined in claim 3;

wherein the charged state of said non-aqueous electrolyte battery is a value of 10% to 60% in the solstice season.

8. The non-aqueous electrolyte battery for an artificial satellite as defined in claim 7;

wherein the charged state of said non-aqueous electrolyte battery is a value of 30% to 50% in the solstice season.

* * * * *